United States Patent Office 3,428,429
Patented Feb. 18, 1969

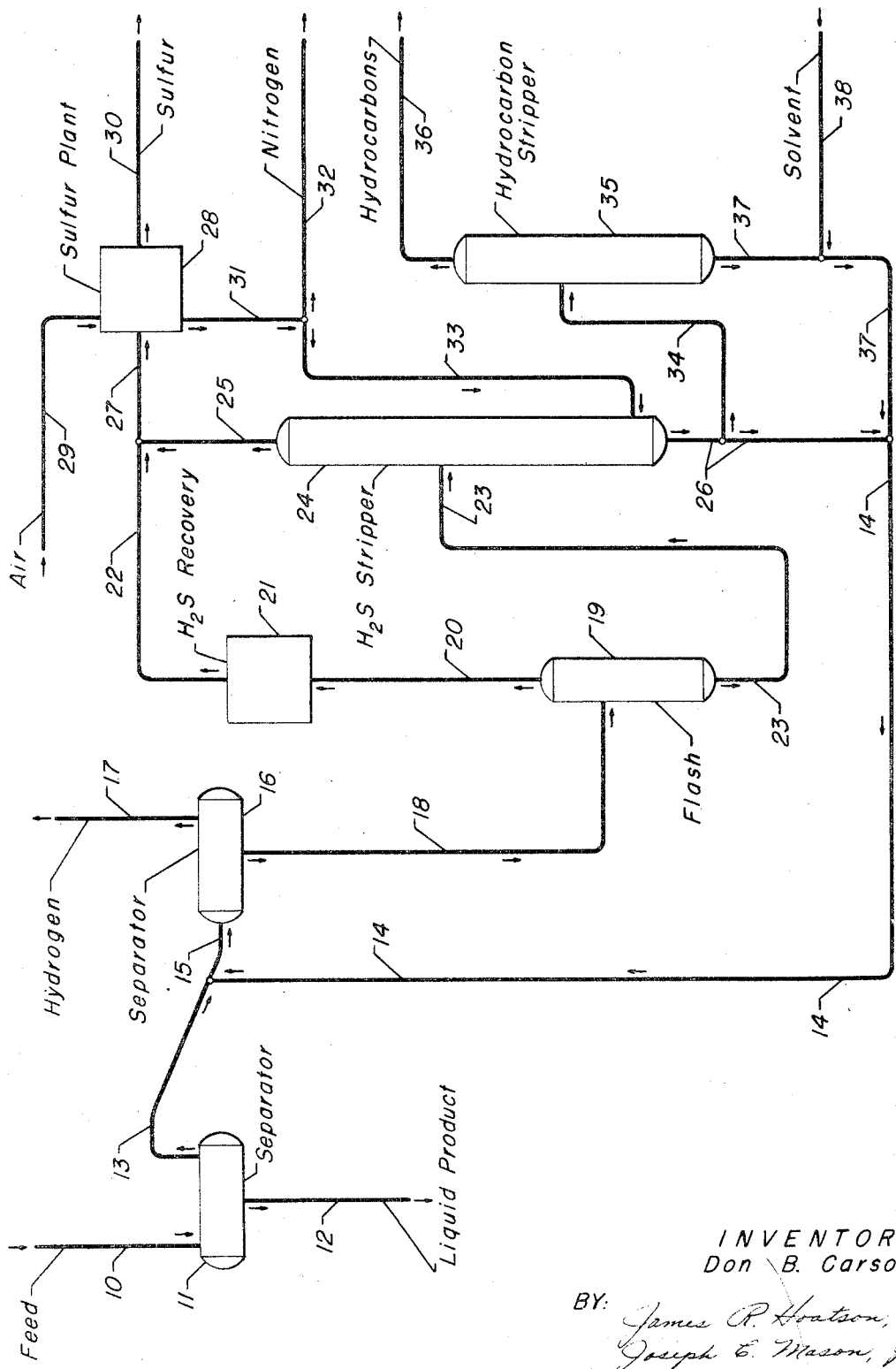

3,428,429
METHOD FOR PURIFYING HYDROGEN
Don B. Carson, Mount Prospect, Ill., assignor to Universal Oil Products Company, Des Plaines, Ill., a corporation of Delaware
Filed Jan. 3, 1967, Ser. No. 607,043
U.S. Cl. 23—212
Int. Cl. C01b 17/16, 1/16
10 Claims

ABSTRACT OF THE DISCLOSURE

Method for purifying a hydrogen gas stream for recycle to a catalytic hydrogenation reaction zone by contacting the impure hydrogen stream with a polyglycol ether absorbent selective for the contaminants, e.g. light paraffinic hydrocarbons and hydrogen sulfide. The contacting is performed preferably as a single stage using an in-line mixer device. The purified hydrogen is separated and recycled to the reactor. The rich-absorbent is then flashed and hydrogen sulfide separated from the flashed absorbent with a stripping gas comprising nitrogen derived from the conversion of the hydrogen sulfide to sulfur via air oxidation.

---

This invention relates to a method for concentrating hydrogen. It particularly relates to a method for concentrating hydrogen for recycle to a catalytic hydrogenation zone. It specifically relates to a method for removing hydrogen sulfide from the recycle hydrogen stream associated with a "black oil" catalytic hydrogenation process for the removal of sulfur therefrom.

In refinery practice, various processes commonly employed in refining petroleum products yield by-product gases containing hydrogen in admixture with methane and other light hydrocarbons, such as ethylene, ethane, propylene, propane, butenes, butadienes, butanes, and etc. Examples of such processes are thermal cracking, catalytic cracking, catalytic reforming, various combinations of these processes, and the like. Concentration of hydrogen in these gases usually is too low to permit its use directly in other processes such as synthesis of ammonia, hydrogenation of edible fats, and the hydrotreating of lubricating oils. Therefore, it is desirable to separate and recover the hydrogen from such other gases for use in refinery operations.

Any suitable granular solid hydrogenation catalyst can be employed in the hydrogenation process according to the invention, e.g. cobalt, molybdenum, platinum, iron, nickel, oxides or sulfides of such metals, etc. Conventional carriers of the catalyst can also be employed, e.g. silica gel, alumina, bauxite, clay, activated carbon, etc.

The latter problem of purifying the recycle hydrogen is particularly acute since contaminants such as light paraffinic hydrocarbons and hydrogen sulfide are produced in the reaction and tend to concentrate in the recycle system if not removed. In addition, contaminants are charged to the system by way of the fresh hydrogen feed gas which is usually a hydrogen-containing stream derived from a catalytic reforming unit and which also contains significant quantities of contaminants such as light paraffinic hydrocarbons; that is, light hydrocarbons and acid gas tend to build up in the recycle system with the result that the purity of the recycle hydrogen begins to decrease to the point where the efficiency of the hydrogenating reaction tends to decline and/or the stability and/or life of the catalyst begins to decrease. Therefore, it is desirable to purify the hydrogen recycle stream preferably within the hydrogenating reaction zone circuit prior to re-entry to the reactor for further reaction.

Accordingly, it is an object of this invention to provide a method for separating gases.

It is another object of this invention to produce a concentrated hydrogen gas stream using an improved absorption medium.

It is still another object of this invention to produce high purity hydrogen from a gaseous fraction containing hydrogen and other low molecular weight gases.

It is a specific object of this invention to provide a method for producing high purity hydrogen for use in a hydrogenating reaction.

Therefore, in accordance with one embodiment of the present invention, there is provided a method for concentrating hydrogen which comprises contacting a gaseous charge mixture containing hydrogen, hydrocarbons, and hydrogen sulfide with an absorption medium selective for hydrocarbons and hydrogen sulfide under conditions sufficient to absorb non-hydrogen components therefrom; separating the contacted mixture into a hydrogen-rich stream and a stream comprising rich-absorption medium having hydrocarbons and hydrogen sulfide dissolved therein; passing said rich-absorption medium into separation means to produce a first gaseous fraction comprising hydrogen sulfide and a first liquid fraction comprising absorption medium containing hydrocarbons and hydrogen sulfide; stripping said first liquid fraction with hereinafter specified stripping gas under conditions sufficient to produce a second gaseous fraction containing hydrogen sulfide, and a second liquid fraction comprising absorption medium; introducing hydrogen sulfide from at least one of said hereinabove specified gaseous fractions into a conversion zone in the presence of air under conditions sufficient to convert hydrogen sulfide to sulfur, and to produce a third gaseous fraction comprising nitrogen; and introducing at least a portion of said third gaseous fraction into said stripping zone as stripping gas.

A particular embodiment of this invention involves the method hereinabove wherein said absorption medium comprises a major proportion of polyglycol ether and a minor proportion of a hydrocarbon at least partially soluble in said ether.

A specific embodiment of this invention provides a method for purifying contaminated hydrogen gas which comprises contacting a charge mixture containing from 50 to 90 mol percent hydrogen, the remainder being light hydrocarbons and hydrogen sulfide as contaminants therein, with a liquid absorbent composition comprising by volume 50% to 90% polyalkylpolyethyleneglycol ether, 0% to 48% alkylamine having from 6 to 18 carbon atoms per molecule, and 2% to 50% hydrocarbon at least partially soluble in said ether, in an absorption zone at relatively high pressure to effect absorption of at least a major proportion of the net non-hydrogen contaminants in said mixture; withdrawing from the absorption zone a purified hydrogen stream and a rich-absorbent having contaminants dissolved therein; passing said rich-absorbent into separator means at relatively medium pressure to produce a first gaseous stream comprising hydrogen sulfide and a first liquid stream comprising absorbent having reduced contaminant content; stripping said first liquid stream with hereinafter specified stripping gas in a stripping zone at relatively low pressure; removing from the stripping zone a second gaseous stream containing hydrogen sulfide and a second liquid stream comprising said ether; introducing hydrogen sulfide from at least one of said hereinabove specified gaseous streams into a conversion zone in the presence of air under conditions sufficient to convert hydrogen sulfide to sulfur and to produce a third gaseous stream comprising nitrogen; and passing at least a portion of said third gaseous stream into said stripping zone as stripping gas.

Hydrogenation is a general term known to those skilled in the art, and, as used herein, includes hydrocracking wherein hydrocarbon feed stocks which are of relatively high molecular weight are converted to mixtures of hydrocarbons of relatively low molecular weight. Generally, the conversion reaction is carried out at an elevated temperature in the presence of a catalyst and hydrogen-containing gas. Typically, the conditions for converting hydrocarbon feed stocks into lighter (or low boiling hydrocarbons) include a pressure in excess of 1500 p.s.i.g. with temperatures and space velocities being conventional, as those skilled in the art well know.

The hydrocarbon feed stocks which may be satisfactorily hydrogenated, particularly for removal of nitrogen and sulfur compounds therefrom, may have a wide range of compositions and may contain large concentrations of saturate hydrocarbons in addition to aromatic hydrocarbons. Most generally, for the hydrogenating reaction the feed stock will range from naphtha to kerosene through light and heavy gas oils; although, more recently the reduced crudes and heavy residuums commonly called "black oils" have been successfully hydrogenated (and hydrocracked) to more valuable products. A particularly suitable feed stock is one containing paraffinic hydrocarbons of at least 5 carbon atoms per molecule and having an upper boiling point within the range of from 600° F. to 1100° F.

The catalyst employed in the hydrocracking reaction may be selected from the various well known hydrocracking catalysts which typically comprises a hydrogenation component and a solid acidic hydrocracking component. Preferably, the hydrocracking catalyst further comprises a minor amount of an activity controlling component which effectively provides a balance in the hydrogenation activity relative to the acidity during the overall conversion reaction. Still further, the hydrocracking catalyst preferably contains minor amounts of nickel, e.g. about 0.5% to 10% by weight nickel, on silica-alumina support. Therefore, as used herein, the preferred hydrocracking catalyst composition will be referred to as a nickel-containing catalyst. Other hydrocracking catalyst known to those skilled in the art may also be used in some cases with satisfactory results.

The process conditions which are employed in the hydrocracking reaction can be selected over a relatively wide range and are of necessity correlated according to the particular catalyst employed so as to produce a desired conversion; that is, the percentage of feed stock converted to desirable products. Generally, satisfactory conversions are obtained with the herein described feed stock using the preferred nickel-containing catalyst at a pressure within the range of from 400 p.s.i.g. to 10,000 p.s.i.g., preferably from 1,000 p.s.i.g. to 3,000 p.s.i.g.; liquid hourly space velocity from 0.1 to 10, preferably from 0.7 to 3; and hydrogen-to-oil ratio between 1,000 and 30,000 standard cubic feet per barrel (s.c.f./b.), preferably between 5,000 and 15,000 s.c.f./b. In any instance, it is important that the process conditions for the hydrocracking step are sufficient to effect hydrocracking of the feed material mixture between products, for example, of non-gaseous paraffinic hydrocarbons comprising from $C_1$ to $C_3$ hydrocarbons, i.e. the conditions are chosen so that less than 50% by weight, preferably from 2% to 3% by weight of $C_1$ to $C_3$ hydrocarbons are produced.

Hydrogen is consumed in the hydrogenating reaction; therefore, it is necessary to maintain an excess of hydrogen in the reaction zone. A particularly useful place to obtain hydrogen is from a catalytic reforming operation which is a net producer of hydrogen. Normally, the hydrogen gas produced by catalytic reforming is impure in that it contains from 40% to 85%, on a mol basis, hydrogen. In another fashion, the normally gaseous fraction separated from the effluent of the hydrogenating reaction zone contains primarily hydrogen which is contaminated with light hydrocarbons, such as methane, and acid gas, such as hydrogen sulfide. In conventional operation this impure hydrogen gas is separated from the reaction zone effluent and, preferably, is recycled to the reaction zone; however, as previously mentioned hereinabove with reference to the embodiments of the present invention, the hydrogen gas frequently is so contaminated that its purity is too low for direct recycle to the reaction zone, i.e. its purity is generally in the range of from 50% to 60% (mol) hydrogen.

Therefore, in brief, in the practice of this invention the impure hydrogen gas from the hydrogenating reactor effluent stream is cooled and scrubbed with an absorbent composition selective for the light hydrocarbons and acid gas. The mixture of hydrogen and rich-absorbent is passed into a relatively high pressure separator wherein purified hydrogen gas is separated from the enriched absorbent. The purified hydrogen gas is then preferably recycled to the reactor. The rich-absorbent composition is then flashed and stripped in order to remove light hydrocarbons and to collect at least part of the hydrogen sulfide gas. The separated $H_2S$ is converted into sulfur by air oxidation and the by-product nitrogen gas is used to strip the absorbent composition. By operating in this fashion, the absorbent composition is regenerated and is suitable for reuse in the contacting step with impure hydrogen.

The polyglycol ether compound which acts as one component of the absorbent and/or as the carrying agent for the organic amine, if any, is preferably selected to provide a composition which is liquid in all stages of the inventive method. The preferred glycol ether compound is also a relatively non-viscous material having a relatively high boiling point so that it will remain in liquid phase at the temperatures and pressures utilized herein. Another characteristic of a satisfactory glycol ether is that it should be highly miscible with the organic amine, if any, and with the light hydrocarbon components present in the contaminated gas stream being scrubbed. As will be more fully discussed herein, the preferred ether must also be at least partially miscible with the required hydrocarbons portion of the absorbent composition.

Thus, one of the most useful and readily available classes of glycol ether compounds for use in the present invention are members of the polyalkylpolyethyleneglycol family generally containing from 2 to 6 ethylene units per molecule. Examples of this class of suitable ethers include dimethoxytetraethylene glycol, dimethoxytriethylene glycol, dibutoxytriethylene glycol, dibutoxydiethylene glycol, dipropoxytetraethylene glycol, dipropoxytriethylene glycol, diproproxydiethylene glycol, and appropriate mixtures thereof. Such ethers generally boil in the range of from 200° C. to 300° C. The distinctly ether is a mixture comprising dimethoxytriethylene glycol and dimethoxytetraethylene glycol in approximately molar proportions by weight since this mixture has high selectivity for hydrocarbon contaminants as well as acid gas contaminants contained in the effluent hydrogen gas stream from a hydrocracking process. The ether compound is utilized in its substantially anhydrous condition, e.g. less than 0.5% by weight water so that any water present in the feed gas mixture is also removed by the processing scheme embodied in the present method. In same cases, however, the water content of the glycol ether may be as high as about 8% of the final composition.

Depending upon the extent to which acid gas such as hydrogen sulfide, is present in the impure hydrogen stream and the degree to which this gas is to be removed, it may be desirable to include as a component of the absorption medium an organic amine. Generally, the organic amine is selected from the class of compounds characterized as organic bases containing one or more amino groups attached to a hydrocarbon group. The preferred organic amines which may be used in the present invention are compounds having a relatively low vapor pressure so that substantial vaporization of the amine does not occur under the conditions of temperature and pressure used herein. Suitable organic amines for this purpose may be selected from the aliphatic, aromatic, naphthenic and heterocylic amines as well as from the alkanol amines containing one or more amino and/or hydroxyl groups per molecule. The amine may also be a primary, secondary or tertiary amine. The secondary amines are particularly useful in the present absorbent composition. Typically, secondary amines utilizable in the present invention include compounds such as dipropylamine, diisopropylamine, isopropyl - n - propylamine, n - butylmethylamine, n-butylisopropylamine, sec-butylmethylamine, sec-butyl-tert-butylamine, di-isobutylamine, di-n-hexylamine, di - cyclohexylamine, propylnonylamine, dioctylamine, tolylisopropylamine, N-monomethyl aniline, morpholine, and homologs and analogs thereof. It is distinctly preferred to use diisopropylamine as the organic amine compound, if any.

The required hydrocarbon constituent of the present absorbent composition is generally selected from a class of hydrocarbons containing from about 6 to about 18 carbon atoms per molecule, preferably from 8 to 12 carbon atoms and which is at least partially soluble in the class of glycol ethers selected for use in the present invention. The general class of hydrocarbons suitable for use herein include aromatic hydrocarbons such as benzene, toluene, etc.; olefinic hydrocarbons such as hexene, cyclohexene, and the like; and naphthenic hydrocarbons including paraffinic hydrocarbons such as methylcyclopentane, cyclohexane, isooctane, and the like. Excellent results are obtained by using the relatively high molecular weight paraffinic hydrocarbons, i.e. from 8 to 12 carbon atoms per molecule, such as the octanes, e.g. iso-octane, and the nonanes. It is to be understood, however, that the hydrocarbon constituent of the preferred absorbent composition can be any paraffinic-containing hydrocarbon stream which can be characterized by the substantial absence of both aromatic hydrocarbons and olefinic hydrocarbons. It follows, therefore, that the preferred paraffinic hydrocarbon-containing stream which is an integral part of the absorbent composition may be formulated in some cases, in situ, by operating the present invention as herein described to tailor the absorbent composition such that it contains sufficient quantities of paraffinic hydrocarbons at least part of which were originally present in the hydrogen-containing gas stream to be treated. Preferably, however, the hydrocarbon component is initially injected into the absorbent composition during the regeneration thereof, as more fully discussed hereinbelow.

The hydrocarbon component of the absorbent composition is present in an amount corresponding to 2% to 50% by weight of the resulting lean absorbent composition. The extent of hydrocarbon present in the composition depends upon the particular contaminant to be removed. For example, if a high concentration of $H_2S$ is to be removed from the hydrogen-containing stream, the hydrocarbon should be present in an amount from 2% to 50% by weight, preferably from 5% to 30% by weight, and typically, about 10% by weight. On the other hand, for removal of large amounts of methane, the hydrocarbon component should be present in the absorbent composition in an amount from 5% to 50%, preferably from 20% to 50%, and typically, about 30%.

The glycol ether constituent of the present absorbent composition is present in an amount corresponding from 50% to 90% by weight of the resulting lean absorbent composition. Similarly, the amount of organic amine present, if any, ranges in an amount corresponding from 0% to 48% by weight of the resulting lean absorbent composition. Those skilled in the art will know from the teachings contained herein how to alter the composition of the absorbent so that optimum results may be obtained. A typical absorbent composition for the high $H_2S$ situation mentioned above would include 50% preferred ether mixture as hereinabove defined, 40% diisopropylamine, and 10% iso-octane. A preferred absorbent composition for normal commercial operation comprises 50% to 90% of a mixture comprising dimethoxytriethylene glycol ether and dimethoxytetraethylene glycol ether and 10% to 50% hydrocarbon comprising $C_8$ to $C_{12}$ paraffinic hydrocarbons.

The invention is more specifically described with reference to the accompanying drawing which is a diagrammatic flow diagram illustrating a preferred arrangement of apparatus for conducting one embodiment of the invention.

A hydrocarbon feed mixture comprising a fraction boiling between 400° F. and 1100 F. is admixed with a hydrogen-containing stream comprising about 90 mol percent hydrogen in an amount of about 5000 s.c.f./b. This feed mixture is charged into a catalytic hydrogenating zone in contact with suitable hydrogenating catalyst. Typically, the operating conditions maintained in the hydrogenating zone include a temperature of about 700° F., a liquid hourly space velocity of about 0.75, and a pressure of about 2000 p.s.i.g. These conditions are sufficient to produce an effluent stream containing normally liquid hydrogenated product; that is, a product stream containing some lower boiling material than the feed material, and a hydrogen-containing stream contaminated with light hydrocarbons and acid gas, such as hydrogen sulfide. These various components comprise the effluent from the reaction zone and represent feed to the present inventive process.

The effluent stream as hereinabove defined is passed into the process via line 10 and introduced after suitable cooling (not shown) into separator 11 at a temperature of about 140° F. and a pressure of about 2000 p.s.i.g. The normally liquid product stream comprising the conversion products is withdrawn from separator 11 via line 12 for recovery therefrom of the desired more valuable products, such as gasoline boiling range material. An impure hydrogen gas stream comprising by mol hydrogen 56%, methane 25%, ethane 9%, propane 3.5%, butanes and heavier 2.1%, hydrogen sulfide 3.6%, carbon dioxide 0.6%, and nitrogen 0.2%, is separated from the effluent and withdrawn via line 13.

The impure hydrogen stream in line 13 is cooled to a temperature from 100° F. to 200° F., typically 140° F., by means not shown and then contacted with an absorbent composition comprising 70% of the previously mentioned distinctly preferred ether mixture and 30% iso-octane via line 14. The absorbent and impure hydrogen stream are mixed in an amount from 0.005 to 2.0 cubic feet absorbent per standard cubic foot of gas to be dissolved, preferably from 0.05 to 0.5 c.f./s.c.f., typically about 0.1 c.f./s.c.f., and passed through an in-line mixer device (not shown) through line 15 into separator 16. It is to be noted at this point that the operating conditions in separator 16 and separator 11 are similar in pressure, e.g. about 2000 p.s.i.g., although separator 16 may be at a lower temperature. The materials in line 13 and line 14 have been cooled (by means not shown) in order to improve the effectiveness of hydrocarbon removal and acid gas removal from the hydrogen-containing stream. Operation conditions within separator 16 include a relatively high pressure of from 1000 p.s.i.g. to 3000 p.s.i.g., preferably from 1000 p.s.ig. to 2000 p.s.i.g. and more preferably of approximately the same pressure as was present in separator 11. The only differences between the two separators is the normal pressure drop through the system including any heat exchangers, valves, mixing devices, and the like. The temperature in separator 16, generally, is in the range of from 50° F. to 300° F., preferably from 120° F. to 150° F., and typically, about 140° F. whereby at least a major proportion of the net non-hydrogen contaminants in the feed mixture from line 13 are absorbed. From the top of separator 16 a concentrated hydrogen stream, e.g. about 75 mol percent is removed via line 17, preferably for reuse in the hydrocracking reaction zone in admixture with fresh hydrogen from an extraneous source (not shown) such as a catalytic reforming unit. As used herein, the term "net" is intended to include these hydrocarbons produced in the reaction zone and/or passed into the system via the added hydrogen stream; it excludes the hydrocarbons recycling in the system either via hydrogen recycle or absorbent recycle.

The hydrocarbon-rich and acid gas-rich absorbent is removed from separator 16 via line 18 and introduced into flash drum 19. The purpose of flash drum 19 is to effectuate a one stage separation for removal of at least part of the hydrogen sulfide and most of the light hydrocarbons from the absorbent composition. Generally, the temperature in flash drum 19 will be from 100° F. to 200° F., preferably from 120° F. to 150° F. and typically about 130° F. The pressure in the drum is a relatively medium pressure ranging from 5 p.s.i.g. to 1000 p.s.i.g., preferably from 5 p.s.i.g. to 50 p.s.i.g., and typically, about 10 p.s.i.g. Under these conditions an effective separation is made of a portion of the $H_2S$ and the bulk of the light hydrocarbons from the absorbent composition. Generally, the overhead or flashed material will comprise from 1.0 to 0.01 $H_2S$/hydrocarbon mol ratio (solvent-free basis), preferably from 0.5 to 0.02, and typically 0.05. In similar manner, the bottoms stream comprising absorbent composition having a somewhat reduced $H_2S$ content will comprise from 5 to 100 $H_2S$/hydrocarbon mol ratio (solvent-free basis), preferably from 10 to 30, and typically, about 20.

The denuded absorbent composition still containing dissolved therein a small amount of light hydrocarbon and the bulk of the $H_2S$ is removed from flash drum 19 and passed via line 23 into stripper column 24 at relatively low pressure. Preferably, stripper column 24 is maintained at substantially atmospheric pressure, although, sub-atmospheric and slightly super-atmospheric pressures may be used if desired. As the liquid composition passes through stripper column 24, flash vaporization of the remaining volatile contaminants in the absorbent composition including any residual light hydrocarbon contaminants originally present in the feed mixture and any water absorbed from the feed gas occurs. Simultaneously, if any organic amine had been used as one component of the absorbent composition the amine salt of the acid gas component of the feed gas undergoes decomposition to free the acid gas and the amine. Also, if the amine had been used as part of the absorbent, it may be necessary to use additional heat in stripper column 24 to effect this decomposition; otherwise, no additional heat should be required. However, it is to be noted that only a portion of the acid gases present in the feed mixture were chemically removed by the action of the amine, if any. The remaining portion of the acid gas had been removed by physical absorption into the glycol ether component of the absorbent composition. Therefore, in the case of the use of an amine, significantly less heat is required in stripper column 24 to effectively regenerate the absorbent than is usually required by prior art process schemes. Since the flash vaporization due to the relatively low pressure in stripper 24 accomplished the removal of the remaining hydrocarbon contaminants, only enough heat is needed in the stripper to decompose the amine salt and to provide vapors for stripping. As a requirement in the practice of this invention, the stripping of the absorbent composition in stripper 24 is significantly aided by introducing a gas such as nitrogen from a source hereinafter disclosed, into the lower portion of stripper 24 via line 33.

The operating conditions necessary in stripper 24 include a temperature from 100° F. to 300° F., preferably from 120° F. to 180° F., and typically, about 130° F.; and, a pressure from about 2 p.s.i.g. to 100 p.s.i.g., preferably from 2 p.s.i.g. to 20 p.s.i.g., and typically about 5 p.s.i.g. It is to be noted that the pressure in stripper 24 is relatively low compared to the pressure in flash drum 19 which is relatively medium when compared to the pressure in separator 16 which is relatively high. Under thsee operating conditions, an overhead stream comprising from 80% to 100% by mol $H_2S$ (on a nitrogen free basis), preferably 90% to 100%, and typically, about 97% $H_2S$ is removed via line 25. The lean absorbent composition is removed via line 26 and is recycled for contact with the impure hydrogen stream via line 14.

Flexibility of control of the absorbent composition may be achieved by transferring a portion of the lean absorbent composition via line 34 into hydrocarbon stripper 35. The purpose of this diversion is to remove, if necessary, a portion of the relatively heavy hydrocarbons present in the absorbent composition so the resulting lean absorbent composition in line 14 may be maintained at its optimum desired composition as previously discussed hereinabove. In addition, if necessary, additional amounts of any or all of the components in the absorbent composition may be added to the system via line 38. Any hydrocarbons removed from the absorbent composition in stripper 35 will be withdrawn from the process via line 36. The bottoms material in stripper 35 is returned to the system via line 37. Satisfactory operation of hydrocarbon stripper column 35 may be achieved at a temperature from 200° F. to 600° F., preferably from 300° F. to 500° F., and typically, about 400° F.; and a pressure from 2 p.s.i.g. to 50 p.s.i.g., preferably from 2 p.s.i.g. to 10 p.s.i.g., and typically, about 5 p.s.i.g.

Referring again to flash drum 19, the overhead material in line 20 comprising a significant amount of $H_2S$ is passed into $H_2S$ recovery unit 21 which is a conventional type; that is, a circulating amine solution may be used to remove the $H_2S$ from the light hydrocarbon phase. The rich-amine solution is subsequently regenerated in recovery unit 21 for springing of the $H_2S$ in relatively pure state. The rejected light hydrocarbon phase is removed from recovery unit 21 by means not shown. The relatively pure $H_2S$ containing stream is withdrawn from recovery unit 21 via line 22. Preferably, the material in line 22 is admixed with the relatively pure $H_2S$ in line 25 and collectively charged via line 27 into sulfur plant 28. However, in any event, at least one of these $H_2S$-containing streams must be charged to sulfur plant 28.

Sulfur plant 28 is the conventional Claus-type using air oxidation, with the air being introduced to plant 28 via line 29, to convert $H_2S$ to sulfur thereby producing a tail gas containing significant quantities of nitrogen. Usually, the sulfur conversion reaction utilizes bauxite as the catalyst and may be of the once-through type or of the split-stream type Claus unit, which is well known to those skilled in the art. Basically, acid gas at a temperature of about 100° F. to 150° F. is passed through a waste-heat boiler in the presence of air. The combustion products at a temperature of about 425° F. is passed into a first converter containing the bauxite catalyst. The first effluent stream is partially condensed for removal of liquid sulfur and the remaining gases are usually passed into a second converter. Since the reaction is endothermic re-heating may be necessary to prevent sulfur from condensing on the second catalyst bed. The second effluent is condensed to recover sulfur and the remaining tail gases are usually passed through a water-wash tower. At least part of the washed tail-gas containing significant quantities of nitrogen is compressed, if necessary, and passed into the $H_2S$ stripper column 25 as previously mentioned. It is, of course, to be noted from the stoichometry of the reaction that for every mol of $H_2S$ converted to sulfur there is produced a net production of approximately 2 mols of nitrogen.

Consequently, in accordance with the practice of this invention, a sulfur containing stream is removed from plant 28 via line 30. The by-product nitrogen-containing stream is withdrawn from plant 28 via line 31 and an amount sufficient for stripping purposes is circulated via line 33 into the bottom of stripper column 24 as previously mentioned. Depending upon the pressure utilized in stripper column 24 it may be necessary to pump (or compress) nitrogen in line 33 in order to introduce it into column 24. Preferably, a product stream of nitrogen, above the requirements for stripper 24, is removed from the process via line 32 to reject net nitrogen produced and to prevent the buildup of contaminants in the nitrogen circulating stream.

The method of this invention is suitable for any process involving the contacting of hydrogen and liquid hydrocarbons wherein the hydrogen recycle gas becomes contaminated with acid gas and/or light conversion products such as light hydrocarbons. In the practice of this invention broad operating conditions for hydrogenation, including hydrocracking, may be chosen. In some instances hydrogenation for removal of sulfur compounds may be the desired result but the nature of the feedstock also requires that simultaneously some cracking takes place. This latter situation describes the processing of "black oils" for desulfurization purposes. Typical hydrogenating conditions include, for desulfurization of lubricating oils, a temperature from 400° F. to 800° F. and a pressure from 150 p.s.i.g. to 10,000 p.s.i.g., etc., as those skilled in the art know well.

The invention claimed is:

1. Method for concentrating hydrogen which comprises contacting a gaseous charge mixture containing hydrogen, hydrocarbons, and hydrogen sulfide with an absorption medium selective for hydrocarbons and hydrogen sulfide under conditions sufficient to absorb non-hydrogen components therefrom; separating the contacted mixture into a hydrogen-rich stream and a stream comprising rich-absorption medium having hydrocarbons and hydrogen sulfide dissolved therein; passing rich-absorption medium into separation means to produce a first gaseous fraction comprising hydrogen sulfide and a first liquid fraction comprising absorption medium containing hydrocarbons and hydrogen sulfide; stripping said first liquid fraction with hereinafter specified stripping gas under conditions sufficient to produce a second gaseous fraction containing hydrogen sulfide and a second liquid fraction comprising absorption medium; introducing hydrogen sulfide from at least one of said hereinabove specified gaseous fractions into a conversion zone in the presence of air under conditions sufficient to convert hydrogen sulfide to sulfur and produce a third gaseous fraction comprising nitrogen; and, introducing at least a portion of said third gaseous fraction into said stripping zone as stripping gas.

2. Method according to claim 1 wherein said second liquid fraction is recycled for contact with gaseous charge mixture.

3. Method according to claim 1 wherein said absorption medium comprises a major proportion of polyglycol ether, and minor proportions of a hydrocarbon at least partially soluble in said ether.

4. Method according to claim 2 wherein the hydrogen sulfide in said first and second gaseous fractions is passed into said conversion zone.

5. Method according to claim 1 wherein at least a portion of said second liquid fraction is passed into a separation zone under conditions sufficient to produce an overhead fraction comprising hydrocarbons and a bottoms fraction comprising absorption medium.

6. Method according to claim 5 wherein said bottoms fraction is recycled for contact with gaseous charge mixture.

7. Method according to claim 6 wherein said polyglycol ether is a mixture of polyalkylpolyethylene glycol ethers containing from 2 to 6 ethylene units per molecule.

8. Method for purifying contaminated hydrogen gas which comprises contacting a charge mixture containing by mol from 50% to 90% hydrogen, the remainder being light hydrocarbons and hydrogen sulfide as contaminants therein, with a liquid absorbent composition comprising by volume 50% to 90% polyalkylpolyethyleneglycol ether, 0% to 48% alkylamine having from 6 to 18 carbon atoms per molecule, and 2% to 50% hydrocarbon at least partially soluble in said ether in an absorption zone at relatively high pressure to effect absorption of at least a major proportion of the non-hydrogen contaminants in said mixture; withdrawing from the absorption zone a purified hydrogen stream and a rich-absorbent having contaminants dissolved therein; passing said rich absorbent into separator means at relatively medium pressure to produce a first gaseous stream comprising hydrogen sulfide and a first liquid stream comprising absorbent having reduced contaminant content; stripping said first liquid stream with hereinafter specified stripping gas in a stripping zone at relatively low pressure; removing from the stripping zone a second gaseous stream containing hydrogen sulfide and a second liquid stream comprising said ether; introducing hydrogen sulfide from at least one of said hereinabove specified gaseous streams into a conversion zone in the presence of air under conditions sufficient to convert hydrogen sulfide to sulfur and to produce a third gaseous stream comprising nitrogen; and, passing at least a portion of said third gaseous stream into said stripping zone as stripping gas.

9. Method according to claim 8 wherein at least a portion of said second liquid stream is passed into a separation zone under conditions sufficient to produce a third liquid stream comprising absorbent suitable for re-use in the absorption zone.

10. Method according to claim 9 wherein said third liquid stream is recycled to said absorption zone.

References Cited

UNITED STATES PATENTS

| | | | |
|---|---|---|---|
| 2,664,345 | 12/1953 | Kohl et al. | 23—225 |
| 2,760,848 | 8/1956 | Dunning | 23—225 |
| 2,781,863 | 2/1957 | Bloch et al. | 23—225 XR |
| 2,901,326 | 8/1959 | Kurata et al. | 23—225 |
| 3,144,307 | 8/1964 | Haines | 23—225 |
| 3,186,789 | 6/1965 | Ward et al. | 23—225 XR |
| 3,284,162 | 11/1966 | Deal et al. | 23—225 XR |
| 3,366,455 | 1/1968 | Childers et al. | 23—225 |

FOREIGN PATENTS

| | | |
|---|---|---|
| 1,069,590 | 11/1959 | Germany. |
| 1,210,005 | 2/1966 | Germany. |

EDWARD STERN, *Primary Examiner.*

U.S. Cl. X.R.

23—181, 225, 312